United States Patent [19]

Focke

[11] Patent Number: 4,941,374

[45] Date of Patent: Jul. 17, 1990

[54] PROCESS AND APPARATUS FOR THE LOADING OF PALLETS IN LAYERS

[75] Inventor: Heinz Focke, Verden, Fed. Rep. of Germany

[73] Assignee: Focke & Co. (GmbH & Co.), Verden, Fed. Rep. of Germany

[21] Appl. No.: 196,577

[22] Filed: May 20, 1988

[30] Foreign Application Priority Data

Jun. 25, 1987 [DE] Fed. Rep. of Germany ....... 3720933

[51] Int. Cl.$^5$ ............................................. B65G 57/04
[52] U.S. Cl. .......................................... 83/13; 53/157; 83/29; 83/276; 414/786; 414/792.9; 414/793
[58] Field of Search ...................... 53/157; 83/92, 92.1, 83/94, 13, 29, 276; 414/42, 71, 786, 789.5, 792.9, 793

[56] References Cited

U.S. PATENT DOCUMENTS

| | | | |
|---|---|---|---|
| 2,524,846 | 10/1950 | Socke et al. | 414/71 X |
| 3,135,150 | 6/1964 | Raynor | 83/94 |
| 3,710,532 | 1/1973 | Smilek et al. | 414/42 |
| 4,079,645 | 3/1978 | Nunes et al. | 414/42 |
| 4,753,564 | 6/1988 | Pearce et al. | 414/789.5 X |

FOREIGN PATENT DOCUMENTS

| | | |
|---|---|---|
| 526175 | 6/1956 | Canada ................................. 414/42 |
| 1822872 | 8/1959 | Fed. Rep. of Germany . |
| 1511532 | 8/1969 | Fed. Rep. of Germany . |
| 2605197 | 9/1976 | Fed. Rep. of Germany . |
| 2649634 | 5/1978 | Fed. Rep. of Germany . |
| 2919624 | 12/1979 | Fed. Rep. of Germany . |
| 3034809 | 3/1982 | Fed. Rep. of Germany . |
| 3515818 | 11/1986 | Fed. Rep. of Germany . |

OTHER PUBLICATIONS

These references cited by applicant in paper #4, filed 7-19-88.

*Primary Examiner*—Robert J. Spar
*Assistant Examiner*—Janice Krizek
*Attorney, Agent, or Firm*—Sughrue, Mion, Zinn, Macpeak & Seas

[57] ABSTRACT

In the loading of pallets (10) with cartons (11) arranged in layers (carton layer 14), intermediate layers (24) consisting of paper or the like frequently have to be introduced between the carton layers (14). The pallets (10) are loaded by a palletizer (13) which is known for these purposes and which has a pivotable and multiply bendable cantilever arm (19). The intermediate layers (24) are laid onto the carton layers (14) by this cantilever arm (19) with a suction holder (23). At the same time, portions of a continuous web of material (25) running off from a reel (26) are drawn onto the completed carton layer (14) and then severed to the correct size from the web of material (25).

10 Claims, 2 Drawing Sheets

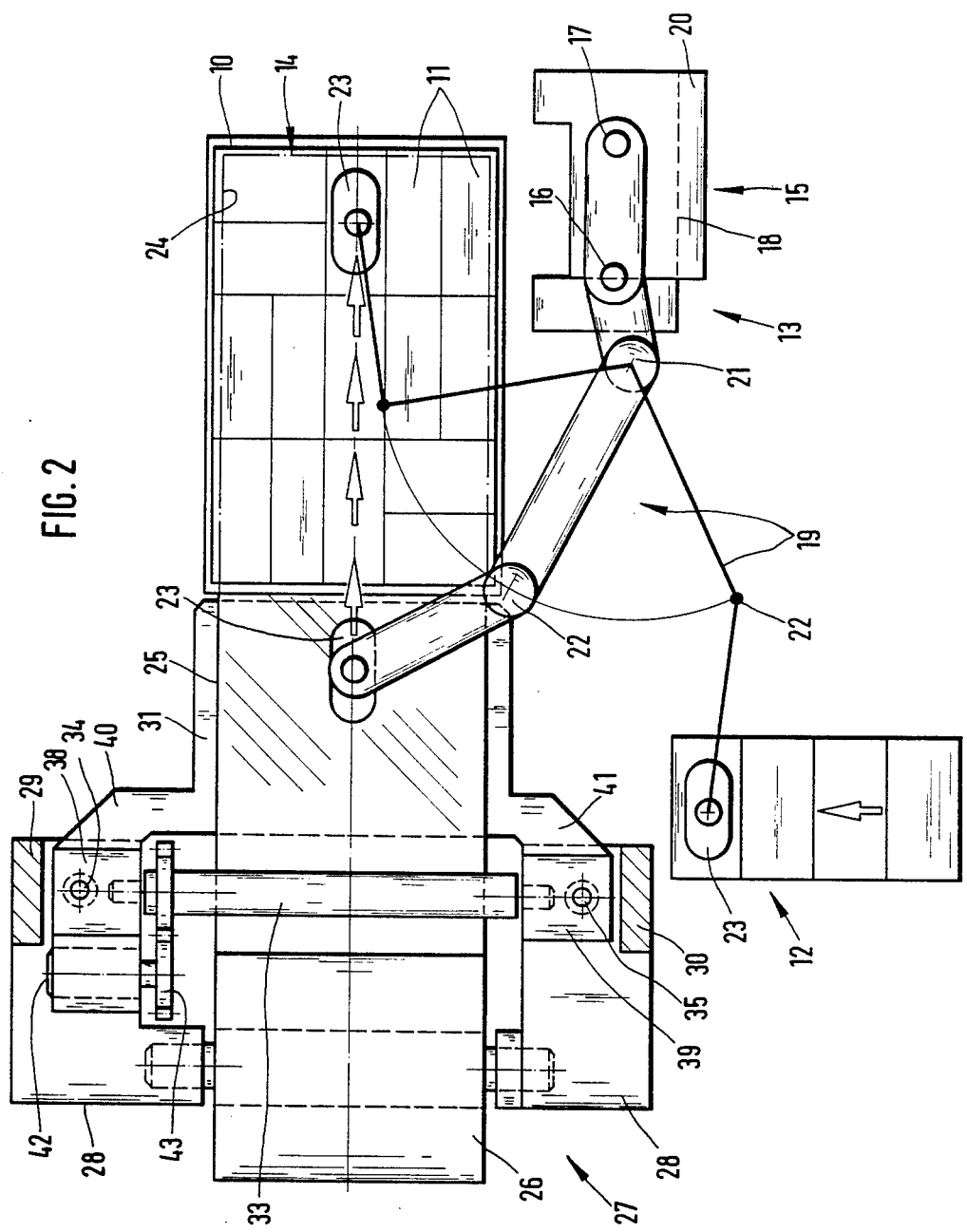

PROCESS AND APPARATUS FOR THE LOADING OF PALLETS IN LAYERS

BACKGROUND OF THE INVENTION

The invention relates to a process for the loading of pallets or the like in layers with stackable articles, especially packaging cartons, with a palletiser having a raisable, lowerable and pivotable cantilever arm which is equipped with at least one joint and the free end of which has a holding member, especially a suction holder, for grasping the articles, intermediate layers consisting especially of paper introduced between layers of the articles. The invention relates, furthermore, to an apparatus for carrying out the process.

For the mechanical or automatic loading of pallets, palletisers designed and operating in the manner of robots have recently been used. These consist of a cantilever arm which is mounted on upright supporting columns so as to be vertically moveable. The cantilever arm is conventionally divided into several part arms which are connected to one another by means of joints. This provides possibilities for moving the suction holder which allow complex handling of the articles when they are deposited on the pallet. The packaging cartons to be stacked on the pallet are grasped on top by the suction holder and are put down next to one another on the pallet to form a carton layer.

In specific uses, it is necessary or advantageous to introduce thin intermediate layers consisting especially of paper blanks between the layers of articles on the pallet. The function of these intermediate layers is, above all, to improve the cohesion of the articles within a layer and, consequently, the stability of the entire stack on the pallet. The intermediate layers, which are rectangular or square according to the size and shape of the pallet, have hitherto been put in place by hand.

SUMMARY OF THE INVENTION

The object on which the invention is based is to simplify, particularly mechanize and automate further, the loading of pallets or the like in layers with stackable articles and with thin intermediate layers.

To achieve this object, the process mentioned in the introduction is characterised in that, after a particular layer of articles has been completed, the intermediate layer is laid onto the finished layer of articles in the correct position by the cantilever arm, the intermediate layer being grasped by the suction holder.

The cantilever arm with the suction holder thus has a double function in the invention. On the one hand, the packaging cartons or the like are transferred successively onto the pallet in layers. On the other hand, however, after each layer of packaging cartons has been completed, an intermediate layer is brought into position by the cantilever arm, the suction holder grasping the particular intermediate layer.

In a preferred exemplary embodiment of the invention, the intermediate layers are produced from a paper web or the like which is drawn by the cantilever arm, in portions corresponding to the size of the intermediate layer to be produced, onto the top of the layer of articles to be covered, and which is then severed. At the same time, according to the invention, the web of material is drawn off from a reel and guided via a deflecting roller which is vertically adjustable according to the loading level of the pallet. Where a reel mounted fixed in place is concerned, this vertically adjustable deflecting roller ensures that the portion of the web of material to be conveyed by the cantilever arm or the suction holder always extends essentially horizontally and level with the layer of articles to be covered. After a portion of the web of material has been laid on the finished layer of articles in the correct position, a blank of corresponding size is cut off from the web of material.

According to the invention, the deflecting roller can be driven, so that the essential pulling and advancing force is transmitted to the web of material by the deflecting roller.

Further features of the invention relate to a process for producing and applying the intermediate layers and to an apparatus in conjunction with a palletiser.

BRIEF DESCRIPTION OF THE DRAWING

An exemplary embodiment of the apparatus is explained in detail below with reference to the drawings. In these:

FIG. 2 shows a plan view of the representation of FIG. 1.

DESCRIPTION OF A DETAILED EMBODIMENT

Figure 1:
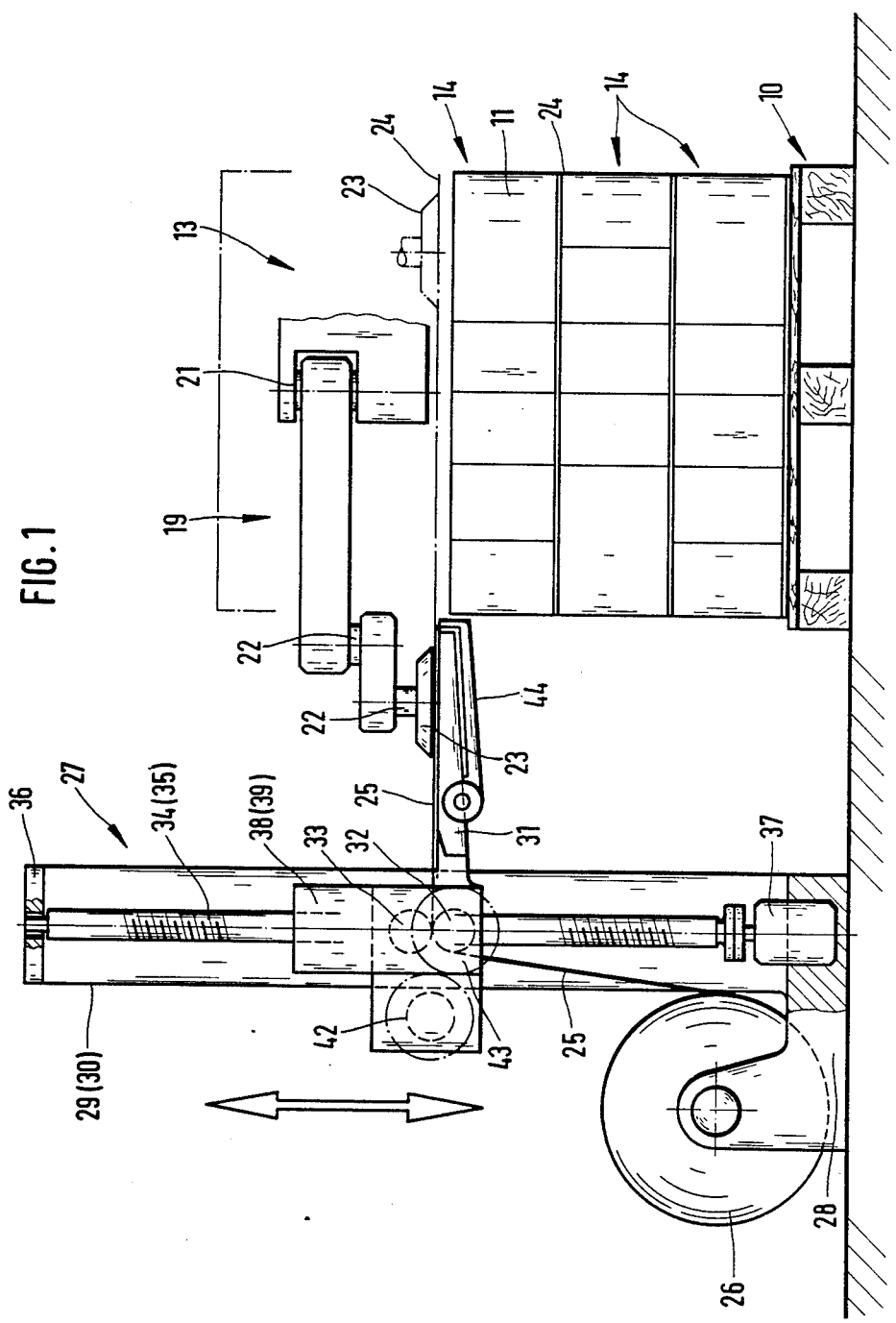
FIG. 1 shows a diagrammatic side view of an apparatus for loading pallets with thin intermediate layers.

The apparatus illustrated serves for loading pallets 10 with cartons 11. These cuboid articles as packaging containers are delivered close up to one another to a receiving station 12 on a conveyor not shown in detail. The cartons 11 are picked up from the conveyor in succession by a conveying device, that is to say by a palletiser 13, and put down on the pallet 10 in carton layers 14.

The palletiser is designed in a known way, for example in the way described in German Patent Application No. P 3,613,089.3 or in German Patent Application No. P 3,638,991.9. The palletiser shown diagrammatically here consists of a supporting structure 15 with vertical guide rods 16, 17. A supporting slide 18 for a cantilever arm 19 is mounted on these so as to be moveable up and down. The guide rods 16, 17 are anchored in a fixed base 20.

The cantilever arm 19 is mounted pivotably on the supporting slide 18 and, furthermore, can be angled in the region of two bending joints 21 and 22. Individual, independently pivotable component arms are obtained thereby. Arranged at the free end of the cantilever arm 19 so formed is a retention means for the article to be conveyed, that is to say a suction holder 23 which grasps each carton 11 on top by means of suction air and holds it in this way.

As a result of the pivotability and bending capacity of the cantilever arm 19, a multiplicity of conveying movements of the suction holder 23 and, therefore, of the carton 11 can be executed. The cartons 11 can be put down at any point on the pallets 10 until a carton layer 14 has been completed.

For stabilising the formation of the carton layers 14, but also for other reasons, it may be necessary to introduce thin intermediate layers 24 between carton layers 14 arranged above one another. These intermediate layers 24 preferably consist of paper or other comparable material. They extend approximately over the entire surface of a carton layer 14.

In the apparatus illustrated, after the completion of a carton layer 14 the intermediate layers 24 are brought from a position of readiness onto the top of the carton layer 14 by the cantilever arm 19 and, therefore, by the palletiser 13. At the same time, the intermediate layer 24 is grasped on its top side by the suction holder 23.

A further special feature is that the intermediate layers 24 are severed in succession from a continuous web of material 25 (paper web). The web of material 25 is provided as a reel 26 which rests in the lower region of a unit 27 for providing the web of material 25 and for feeding it to the pallet 10.

The abovementioned unit 27 consists of a firmly anchored supporting base 28 to which vertical supporting pillars 29, 30 are fastened at a distance from one another. A mounting and guide for the web of material 25 drawn off from the reel 26 is located between the supporting pillars 29, 30.

In the exemplary embodiment illustrated, the web of material 25 is drawn onto a table 31 arranged horizontally. The latter is located in the region, between the unit 27, or the supporting pillars 29, 30 of the latter, and the pallet 10, as a supporting bridge. The web of material 25 is conveyed onto the table 31 via a deflecting roller 32. A mating roller 33, interacting with the deflecting roller 32, is driven. The web of material 25 is conveyed in portions onto the table 31 or to the pallet 10 by means of the deflecting roller 32 with the mating roller 33.

The table 31 is aligned with the top of the completed carton layer 14, as shown in FIG. 1, with the table plane extending slightly above the top of the carton layer 14. For this purpose, the table 31, together with the deflecting roller 32 and mating roller 33, is mounted as a single entity on the unit 27 or on its supporting pillars 29, 30 so as to be moveable up and down. In the exemplary embodiment illustrated, lifting spindles 34, 35 are mounted on the respective sides. The upper ends of the lifting spindles 34, 35 are held rotatably in a transversely directed crossmember 36. The lower ends are anchored in the supporting base 28. At least one of the lifting spindles 34, 35 is driven by means of a motor 37 and is connected to the other lifting spindle via a transverse gear. A spindle body 38, 39 is moved up or down depending on the direction of rotation.

The table 31 is connected to the spindle bodies 38, 39 via lateral holders 40, 41. Furthermore, the deflecting roller 32 and mating roller 33 are mounted rotatably in the spindle bodies 38, 39. Moreover, a drive motor 42 with a toothed gear 43 for the mating roller 33 is attached to a spindle body 38. This unit can therefore be moved up and down between the supporting pillars 29, 30.

For feeding an intermediate layer 24 and positioning it on a carton layer 14, a free end region, resting on the table 31, of the web of material 25 is grasped by the suction holder 23 and drawn in a straight line over the carton layer 14 as a result of appropriate pivoting and bending movements of the cantilever arm 19. This advancing movement of the web of material 25 by means of the cantilever arm 19 is assisted by the propulsion generated by the deflecting roller 32 and mating roller 33.

The web of material 25 is laid on the carton layer 14 exactly in position and is then released. A severing cut can subsequently be made in the region between the carton layer 14 and the table 31, in order to sever the intermediate layer 24, now formed, from the following part of the web of material 25. It is more beneficial first to position a further carton layer 14 on the intermediate layer 24 in the way described and to execute the severing cut only after the further carton layer 14 has been completed. The intermediate layer 25 is fixed in position by the further carton layer 14 resting on the web of material 25.

The intermediate layer 24 can be severed from the web of material 25 in a suitable way. In the exemplary embodiment illustrated, a pivoting knife 44 is arranged on the underside of the table 31. To make a severing cut, this pivoting knife 44 enters a gap formed between the carton layer 14 and the edge of the table 31. The pivoting knife 44 is equipped with a sawtooth-shaped cutting edge known for such purposes.

The apparatus designed in this way allows the automatic loading of pallets 10 with intermediate layers 24, without an additional loading unit and without any manual action.

What is claimed is:

1. Process for the loading of pallets or the like in layers with stackable articles, especially packaging cartons, with a palletiser having a raisable, lowerable and pivotable cantilever arm which is equipped with at least one joint and the free end of which has a holding member, in the form of a suction holder, for grasping individual articles, whereby intermediate layers consisting of paper are introduced between layers of the articles, characterised by: only after each layer of individual articles, respectively, has been completed, laying an intermediate layer (24) onto the completed layer of articles in the correct position by causing the suction holder of the cantilever arm (19) also to grasp, by suction, the intermediate layer; and by producing the intermediate layers from a web of paper material (25) by causing the cantilever arm (19) to draw the web, in portions corresponding to the size of the intermediate layers, onto the top of the carton layer (14) to be covered, and then severing the web.

2. Process according to claim 1, characterised by drawing the web of material (25) in said portions from a reel (26) fixedly in place.

3. Process according to claim 1 characterised by guiding the web of material (25) via a vertically adjustable deflecting point which is aligned with the plane of the completed carton layer (14).

4. Process according to claim 1 and characterised by, in order to assist the drawing-off movement by the cantilever arm (19), driving the web of material (25) intermittently through a portion corresponding to the size of the intermediate layer (24).

5. Process according to claim 1, characterised by severing the web only after another carton layer has been placed on top of an intermediate layer already on top of said carton layer to be covered.

6. Apparatus for the loading of pallets or the like in layers with stackable articles, especially packaging cartons, with a palletiser having a raisable, lowerable and pivotable cantilever arm which is equipped with at least one joint and the free end of which has a holding member, in the form of a suction holder (23), for grasping individual articles characterised by: a supporting device for a reel (26) of a web of material (25) arranged, for the severing of intermediate layers (24), in a predetermined position in relation to the pallet (10) to be loaded, the web of material (25) running via a vertically adjustable deflecting roller (32) set at the respective level of a completed layer of articles; and a guide table (31) arranged between the deflecting roller (32) and the pallet (10) for guiding the web of material (25), said guide table movable up and down together with the deflecting roller (32), the suction holder of the cantilever arm (19) also grasping the web of material (25) in the region of the guide table, to draw the web in portions corresponding to the size of the intermediate layer to a position or top of said completed layer.

7. Apparatus according to claim 6, characterised in that the table (31) and the deflecting roller (32) are arranged on a vertically moveable supporting structure in the form of lateral spindle bodies (38, 39) which are each moveable on a vertical lifting spindle (34, 35).

8. Apparatus according to claim 6 or 7, characterised in that a web-severing device, in the form of an actuatable pivoting knife (44) arranged on the underside of the table (31), is located in the region between the table (31) and the pallet (10) for severing the web.

9. Apparatus according to claim 8, comprising means for actuating the pivoting knife (44) to sever the web only after another carton layer (14) has been loaded on top of the intermediate layer (24) already covering said completed layer.

10. Apparatus according to claim 8, comprising means for actuating the pivoting knife to sever the web before another carton layer has been loaded on top of the web portion already covering said completed carton layer.

* * * * *